United States Patent
Stockman

(10) Patent No.: US 9,324,501 B2
(45) Date of Patent: Apr. 26, 2016

(54) HARD START KIT FOR MULTIPLE REPLACEMENT APPLICATIONS

(71) Applicant: American Radionic Company, Inc., Palm Coast, FL (US)

(72) Inventor: Richard W. Stockman, Ormond Beach, FL (US)

(73) Assignee: American Radionic Company, Inc., Palm Coast, FL (US)

( * ) Notice: Subject to any disclaimer, the term of this patent is extended or adjusted under 35 U.S.C. 154(b) by 0 days.

(21) Appl. No.: 14/299,111

(22) Filed: Jun. 9, 2014

(65) Prior Publication Data

US 2014/0285949 A1 Sep. 25, 2014

Related U.S. Application Data

(63) Continuation of application No. 13/826,689, filed on Mar. 14, 2013, now Pat. No. 8,885,318, which is a continuation of application No. 12/927,476, filed on Nov. 15, 2010, now Pat. No. 8,456,795.

(60) Provisional application No. 61/281,141, filed on Nov. 13, 2009.

(51) Int. Cl.
*H01G 4/32* (2006.01)
*H01G 5/38* (2006.01)
(Continued)

(52) U.S. Cl.
CPC ................ *H01G 4/32* (2013.01); *H01G 4/232* (2013.01); *H01G 4/236* (2013.01); *H01G 4/38* (2013.01); *H01G 5/38* (2013.01); *H02P 1/445* (2013.01)

(58) Field of Classification Search
CPC ........... H01G 4/32; H01G 4/18; H01G 4/015; H01G 4/12

USPC .......... 361/301.5, 301.1, 502–504, 509–512, 361/523, 525, 528–529, 534
See application file for complete search history.

(56) References Cited

U.S. PATENT DOCUMENTS 1,665,499 A 4/1928 Hoch
1,707,959 A 4/1929 Fried
(Continued)

FOREIGN PATENT DOCUMENTS

EP 2587503 5/2013
FR 2343221 9/1977
(Continued)

OTHER PUBLICATIONS

"American Radionic Co., Inc. Introduces a New Circuit Component the Patented Ultramet™ Capacitor," poster by American Radionic Co., Inc., (poster undated, 1980 year date appears below one image), (one page).

(Continued)

*Primary Examiner* — Nguyen T Ha
(74) *Attorney, Agent, or Firm* — Fish & Richardson P.C.

(57) ABSTRACT

A hard start capacitor replacement unit has a plurality of capacitors in a container sized to fit in existing hard start capacitor space. The capacitors are 4 metallized film capacitors wound in a single cylindrical capacitive element. The container has a common terminal and capacitors value terminals for the plurality of capacitors, which may be connected singly or in combination to provide a selected capacitance. An electronic or other relay connects the selected capacitance in parallel with a motor run capacitor. The hard start capacitor replacement unit is thereby adapted to replace a wide variety of hard start capacitors.

31 Claims, 4 Drawing Sheets

(51) Int. Cl.
*H01G 4/38* (2006.01)
*H02P 1/44* (2006.01)
*H01G 4/232* (2006.01)
*H01G 4/236* (2006.01)

(56) References Cited

U.S. PATENT DOCUMENTS

| | | |
|---|---|---|
| 1,943,714 A | 1/1934 | Bailey |
| 2,202,166 A | 11/1937 | Peck |
| 2,569,925 A | 12/1948 | Deeley |
| 2,896,008 A | 12/1953 | Putz |
| 3,015,687 A | 11/1959 | Ruscito |
| 3,302,081 A | 1/1967 | Grahame |
| 3,304,473 A | 2/1967 | Netherwood et al. |
| 3,377,510 A | 4/1968 | Rayno |
| 3,921,041 A | 11/1975 | Stockman |
| 3,988,650 A | 10/1976 | Fritze |
| 4,028,595 A | 6/1977 | Stockman |
| 4,095,902 A | 6/1978 | Florer et al. |
| 4,106,068 A | 8/1978 | Flanagan |
| 4,107,758 A | 8/1978 | Shirn et al. |
| 4,112,424 A | 9/1978 | Lapeyre |
| 4,209,815 A | 6/1980 | Rollins et al. |
| 4,240,126 A | 12/1980 | Sanvito |
| 4,263,638 A | 4/1981 | Stockman et al. |
| 4,312,027 A | 1/1982 | Stockman |
| 4,326,237 A | 4/1982 | Markarian et al. |
| 4,352,145 A | 9/1982 | Stockman |
| 4,363,078 A | 12/1982 | Dwyer |
| 4,398,782 A | 8/1983 | Markarian |
| 4,408,818 A | 10/1983 | Markarian |
| 4,447,854 A | 5/1984 | Markarian |
| 4,486,809 A | 12/1984 | Deak et al. |
| 4,558,394 A | 12/1985 | Stockman |
| 4,586,107 A | 4/1986 | Price |
| 4,631,631 A * | 12/1986 | Hodges et al. ............ 361/306.1 |
| 4,633,365 A | 12/1986 | Stockman |
| 4,633,367 A * | 12/1986 | Strange et al. ................. 361/327 |
| 4,633,369 A | 12/1986 | Lapp et al. |
| 4,639,828 A | 1/1987 | Strange et al. |
| 4,698,725 A | 10/1987 | MacDougall et al. |
| 4,754,361 A | 6/1988 | Venturini |
| 4,812,941 A | 3/1989 | Rice et al. |
| 4,897,760 A | 1/1990 | Bourbeau |
| 5,006,726 A | 4/1991 | Okumura |
| 5,019,934 A * | 5/1991 | Bentley et al. .................. 361/15 |
| 5,138,519 A | 8/1992 | Stockman |
| 5,148,347 A | 9/1992 | Cox et al. |
| 5,313,360 A | 5/1994 | Stockman |
| 5,381,301 A | 1/1995 | Hudis |
| 5,673,168 A | 9/1997 | Efford et al. |
| 5,921,820 A | 7/1999 | Dijkstra |
| 5,940,263 A | 8/1999 | Jakoubovitch |
| 6,009,348 A * | 12/1999 | Rorvick et al. ................... 607/5 |
| 6,014,308 A | 1/2000 | Stockman |
| 6,031,713 A | 2/2000 | Takeishi et al. |
| 6,084,764 A | 7/2000 | Anderson |
| 6,141,205 A | 10/2000 | Nutzman |
| 6,147,856 A | 11/2000 | Karidis |
| 6,157,531 A * | 12/2000 | Breyen et al. ................. 361/519 |
| 6,212,058 B1 | 4/2001 | Huber |
| 6,222,270 B1 | 4/2001 | Lee |
| 6,282,078 B1 | 8/2001 | Tsai |
| 6,282,081 B1 | 8/2001 | Takabayashi et al. |
| 6,310,756 B1 | 10/2001 | Miura et al. |
| 6,313,978 B1 | 11/2001 | Stockman et al. |
| 6,373,720 B1 | 4/2002 | Fechtig et al. |
| 6,385,490 B1 | 5/2002 | O'Phelan |
| 6,404,618 B1 | 6/2002 | Beard et al. |
| 6,490,158 B1 | 12/2002 | Ellyson et al. |
| 6,697,249 B2 | 2/2004 | Maletin et al. |
| 6,798,677 B2 | 9/2004 | Jakob et al. |
| 6,807,048 B1 * | 10/2004 | Nielsen ................... H01G 9/10 361/508 |
| 6,819,545 B1 | 11/2004 | Lobo et al. |
| 6,842,328 B2 * | 1/2005 | Schott ................... B82Y 10/00 361/302 |
| 6,847,517 B2 | 1/2005 | Iwaida et al. |
| 6,888,266 B2 | 5/2005 | Burke et al. |
| 6,922,330 B2 | 7/2005 | Nielsen et al. |
| 6,930,874 B2 | 8/2005 | Lobo |
| 6,982,539 B1 | 1/2006 | Ward |
| 6,995,971 B2 * | 2/2006 | Norton ...................... H01G 9/02 292/25.03 |
| 7,031,139 B1 * | 4/2006 | Fayram ................ A61N 1/3975 361/508 |
| 7,046,498 B1 | 5/2006 | Huang |
| 7,110,240 B2 | 9/2006 | Breyen |
| 7,203,053 B2 | 4/2007 | Stockman |
| 7,365,959 B1 | 4/2008 | Ward |
| 7,423,861 B2 | 9/2008 | Stockman |
| 7,474,519 B2 | 1/2009 | Stockman |
| 7,474,520 B2 | 1/2009 | Kashihara |
| 7,492,574 B2 | 2/2009 | Fresard et al. |
| 7,547,233 B2 | 6/2009 | Inoue et al. |
| 7,667,954 B2 * | 2/2010 | Lessner .................. H01G 11/48 361/503 |
| 7,710,713 B2 | 5/2010 | Restorff |
| 7,835,133 B2 | 11/2010 | Stockman |
| 7,848,079 B1 | 12/2010 | Gordin et al. |
| 7,867,290 B2 | 1/2011 | Nielsen |
| 7,881,043 B2 | 2/2011 | Hirose et al. |
| 7,911,762 B2 | 3/2011 | Stockman |
| 7,911,766 B2 * | 3/2011 | Caumont ................. H01G 4/32 361/502 |
| 7,952,854 B2 | 5/2011 | Stockman |
| 7,987,593 B1 | 8/2011 | Gorst |
| 8,029,290 B2 | 10/2011 | Johnson |
| 8,170,662 B2 * | 5/2012 | Bocek ....................... H01G 9/28 607/2 |
| 8,174,817 B2 * | 5/2012 | Georgopoulos ....... H01G 4/224 361/301.5 |
| 8,270,143 B2 | 9/2012 | Stockman |
| 8,274,778 B2 | 9/2012 | Yoshinaga et al. |
| 8,310,802 B2 | 11/2012 | Fujii et al. |
| 8,331,076 B2 * | 12/2012 | Tuncer ................... H01G 4/105 361/301.4 |
| 8,456,795 B2 * | 6/2013 | Stockman ................. 361/301.5 |
| 8,465,555 B2 | 6/2013 | Sherwood |
| 8,514,547 B2 | 8/2013 | Galvagni |
| 8,514,548 B2 | 8/2013 | Miller et al. |
| 8,531,815 B2 | 9/2013 | Stockman |
| 8,537,522 B2 | 9/2013 | Stockman |
| 8,559,161 B2 | 10/2013 | Takeoka et al. |
| 8,761,875 B2 | 6/2014 | Sherwood |
| 8,861,178 B2 | 10/2014 | Terashima et al. |
| 8,861,184 B2 | 10/2014 | Schmidt |
| 8,871,850 B2 | 10/2014 | Koh et al. |
| 8,885,318 B2 | 11/2014 | Stockman |
| 8,891,224 B2 | 11/2014 | Stockman |
| 9,105,401 B2 | 8/2015 | Dreissig |
| 2001/0025618 A1 | 10/2001 | Kelling |
| 2008/0158780 A1 | 7/2008 | Stockman |
| 2009/0052109 A1 | 2/2009 | Stockman et al. |
| 2009/0219665 A1 | 9/2009 | Stockman |
| 2011/0063775 A1 | 3/2011 | Stockman |
| 2011/0157764 A1 | 6/2011 | Stockman |
| 2011/0228446 A1 | 9/2011 | Stockman |
| 2013/0003252 A1 | 1/2013 | Stockman |
| 2014/0347784 A1 | 11/2014 | Stockman et al. |

FOREIGN PATENT DOCUMENTS

| | | |
|---|---|---|
| GB | 517718 | 2/1940 |
| GB | 2070861 | 9/1981 |
| GB | 2169747 | 7/1986 |

OTHER PUBLICATIONS

"American Radionic Co., Inc. Introduces a New Circuit Component, The Patented Ulramet™ Capacitor," poster by American Radionic Co., Inc., which is reprint from Electronic News dated Feb. 11, 1980, (one page).

(56) References Cited

OTHER PUBLICATIONS

"American Radionic Co., Inc. Introduces . . . The World's First Multiple Metallized Film Dielectric Capacitor Produced from a Single Winding! The Patented Ultramet™ Capacitor," poster by American Radionic Co., Inc. (undated) (one page).
"American Radionic Introduces Capacitors Without Compromise", color brochure, 1989, 1 page.
"The Patented Ultramet™ Capacitor. A product of years of American Radionic research & development," poster by American Radionic Co., Inc. (undated) (one page).
"The Patented Ultramet™ Capacitor," poster by American Radionic Co., Inc., (undated) (three pages).
"AC Capacitors," brochure by AmRad Engineering, Inc., undated, 4 pages.
"American Radionic Company's Chronology of Patents, New Products Programs—From the Present, to the Past, a Thirty-Five Year Review," online website having URL: http:/www.americanradionic.com/content/blogcategory/13/29/8/16 , accessed May 19, 2014, 3 pages.
"American Radionics—Home of the Turbo200 MultiUse Capacitor," online archive of website captured at http://web.archive.org/web/20050309191805fw_/http://www.americanradionic.com/home , Mar. 9, 2005, 16 pages, (accessed May 29, 2014).
"AmRad Engineering: Universal Capacitor," The Air Conditioning|Heating|Refrigeration News, Jan. 29, 2005, Printout of website having URL: http://www.archrnews.com/articles/print/amrad-engineering-universal-capacitor (accessed Jun. 2, 2014), 1 page.
"Capacitors—Motor Run, Oil Filled Capacitors, AC Rated. AmRad." Online archive of website captured at http:/webarchive.org/web/20011126195819/http://www.americanradionic.com, Nov. 26, 2001, 13 pages (accessed May 29, 2014).
"Capacitors—Motor Run, Oil Filled Capacitors, AC Rated. AmRad." Printout of website having URL: http://amradcapacitors.com/index.htm, Jan. 3, 2003, 20 pages.
"Capacitors—Motor Run, Oil Filled Capacitors, AC Rated. AmRad." Online archive of website captured at http://webarchive.org/web/20041214091042/http://americanradionic.com, Dec. 14, 2004, 13 pages (accessed May 29, 2014).
Hudis, Martin et al., "Motor-Run Capacitors," Motors & Motor Control, undated (reprinted from Appliance Manufacturer, Oct. 1994), 3 pages.
Parente, Audrey, "Can-sized device the right fit," The Daytona Beach News-Journal, Jan. 3, 2005, 2 pages.
"Product of the Year Awards," Electronic Products Magazine, Jan. 1981, pp. 39-45.
"Super-Sized Show," AHSRae Journal Show Daily, 2005 International Air-Conditioning, Heating, Refrigerating Exposition, Tuesday, Feb. 8, 2005, 24 pages.
International Search Report and Written Opinion, PCT/US2014/39003, Oct. 2, 2014, 12 pages.
Defendants' First Supplemental Disclosure of Non-Infringement and Invalidity Contentions *American Radionic, Inc.*, v. *Packard, Inc., and Cornell-Dublier Electronics, Inc.*, No. 6:14-cv-01881-RBD-KRS.
Photograph 1 from Defendants' First Supplemental Disclosure of Non-Infringement and Invalidity Contentions, undated (1 page).
Photograph 2 from Defendants' First Supplemental Disclosure of Non-Infringement and Invalidity Contentions, undated (1 page).
Photograph 3 from Defendants' First Supplemental Disclosure of Non-Infringement and Invalidity Contentions, undated (1 page).
Photograph 4 from Defendants' First Supplemental Disclosure of Non-Infringement and Invalidity Contentions, undated (1 page).
Photograph 5 from Defendants' First Supplemental Disclosure of Non-Infringement and Invalidity Contentions, undated (1 page).
Photograph 6 from Defendants' First Supplemental Disclosure of Non-Infringement and Invalidity Contentions, undated (1 page).
Photograph 7 from Defendants' First Supplemental Disclosure of Non-Infringement and Invalidity Contentions, undated (1 page).
Photograph 8, undated (1 page).
Photograph 9, undated (1 page).
Photograph 10, undated (1 page).
Photograph 11, undated (1 page).
Photograph 12, undated (1 page).
Document from Defendants' First Supplemental Disclosure of Non-Infringement and Invalidity Contentions that purported to be Standard for Safety UL 810 Capacitors, Underwriters Laboratories Inc. having multiple dates ranging from 1976 to 1988 (22 pages).
"Industrial Power Factor Correction Capacitors," Cornell Dubilier, Undated (1 page).
Hudis, Martin, "Technology Evolution in Metallized Polymeric Film Capacitors over the Past 10 Years," Presented at CARTS Symposium in Nice, France, Oct. 1996, 9 pages.
Hudis, Martin, "Plastic Case Self-Protected Liquid Filled AC Capacitors for 70° Applications," Presented at CAPTECH '97, Mar. 1997, 7 pages.
Macomber, Laird L., et al., "New Solid Polymer Aluminum Capacitors Improve Reliability," Electro Power Electronics, Oct. 1, 2001, 5 pages.
Macomber, Laird L., et al., "Solid Polymer Aluminum Capacitor Chips in DC-DC Converter Modules Reduce Cost and Size and Improve High-Frequency Performance,"PCIM Power Electronics 2001 Proceeding for the PowerSystems World Conference, Sep. 2001, 8 pages.
Mallory Distributor Products Co., 1967 Precision Electronic Components Catalog, 52 pages.
Photograph 13, undated (1 page).
Photograph 14, undated (1 page).
Photograph 15, undated (1 page).
Photograph 16, undated (1 page).
Photograph 17, undated (1 page).
Photograph 18, undated (1 page).
Photograph 19, undated (1 page).
Photograph 20, undated (1 page).
Complaint for Patent Infringement against Cornell-Dubliner Electronics, Inc., Packard Inc. with Jury Demand (Filing fee $400 receipt No. ORL-38930) filed by American Radionic Company, Inc. (Attachments: #1 Civil Cover sheet, #2 Exhibit A)(LMM) Modified on Nov. 19, 2014 (LMM). (Entered: Nov. 19, 2014).
Answer and affirmative defenses to Complaint by Cornell-Dubliner Electronics, Inc. (Allaman, Melissa) (Entered: Jan. 9, 2015).
Answer and affirmative defenses to Complaint by Packard Inc. (Allaman, Melissa) (Entered: Jan. 9, 2015).
First Amended Answer and affirmative defenses to 1 Complaint by Packard Inc. (Allaman, Melissa) (Entered: Jan. 9, 2015).
First Amended Answer and affirmative defenses to 1 Complaint by Cornell-Dubliner Electronics, Inc. (Allaman, Melissa) (Entered: Feb. 4, 2015).
Case Management and Scheduling Order: Amended Pleadings and Joinder of Parties due by Apr. 9, 2015. Discovery due by Feb. 16, 2016. Dispositive motions due by Apr. 7, 2016. Pretrial statement due by Aug. 11, 2016. All other motions due by Jul. 28, 2016. Plaintiff disclosure of expert report by Dec. 10, 2015. Defendant disclosure of expert report due by Jan. 14, 2016. Final Pretrial Conference set for Aug. 18, 2016 at 01:15 PM in Orlando Courtroom 4 A before Judge Roy B. Dalton, Jr., Jury Trial Set for the trial team commencing Sep. 6, 2016 at 09:00 Am in Orlando Courtroom 4 A before Judge Roy B. Dalton Jr., Conduct mediation hearing by Mar. 29, 2016. Lead counsel to coordinate dates. Signed by Judge Roy B. Dalton, Jr. on Feb. 10, 2015. (VMF). (Entered: Feb. 10, 2015).
Status report Joint Claim Construction Statement by American Radionic Company, Inc., Packard Inc., and Cornell-Dubliner Electronics, Inc. (Attachments: #1 Exhibit 1, #2 Exhibit 2) (Graubart, Noah) Modified on May 29, 2015 (SWT). (Entered: May 28, 2015).
Declaration of Noah C. Graubart in Support of Plaintiff's Claim Construction Brief by American Radionic Company, Inc. (Attachments: #1 Exhibit 1, #2 Exhibit 2, #3 Exhibit 3, #4 Exhibit 4, #5 Exhibit 5, #6 Exhibit 6) (Graubart, Noah) (Entered: Jun. 18, 2015).
Plaintiff'S Brief re 59 Declaration Plaintiff's Claim Construction Brief filed by American Radionic Company, Inc. (Graubart, Noah) (Entered May 18, 2015).
Response to Plaintiff's Claim Construction Brief re 60 Brief—Plaintiff filed by Cornell-Dubliner Electronics, Inc., Packard Inc. (Killen, Craig) Modified on Jul. 17, 2015 (EJS). (Entered Jul. 16, 2015).

(56) References Cited

OTHER PUBLICATIONS

Joint Pre-Hearing Statement re: Claim Construction by American Radionic Company, Inc., Packard Inc., Cornell-Dubliner Electronics, Inc. (Attachments: #1 Exhibit 1, #2 Exhibit 2) (Graubart, Noah) Modified on Jul. 24, 2015.

Minute Entry, Proceedings of Claim Construction Hearing held before Judge Roy B. Dalton, Jr. on Aug. 24, 2015. Court Report: Arnie First (VMF) (FMV). (Entered: Aug. 24, 2015).

Notice of Filing of Claim Construction Evidence by American Radionic Company, Inc. (Attachments: #1 Exhibit 1, #2 Exhibit 2, #3 Exhibit 3) (Graubart, Noah) Modified on Aug. 25, 2015 (EJS). (Entered: Aug. 25, 2015).

Transcript of Markman Hearing held on Aug. 24, 2015 before Judge Roy B. Dalton, Jr., Court Reporter Arnie R. First, DRD, CRR< ArnieFirst.CourtReporter@gmail.com. Transcript may be viewed at the court public terminal or purchased through the Court Reporter before the deadline for Release of Transcript Restriction. After that date it may be obtained through PACER or purchased through the court Reporter, Redaction Request due Oct. 22, 2015. Redacted Transcript Deadline set for Nov. 2, 2015. Release of Transcript Restriction set for Dec. 30, 2015. (ARF) (Entered: Oct. 1, 2015).

Order granting 69 Motion for Consent Judgment and Injunction, Signed by Judge Roy B. Dalton, Jr. on Nov. 5, 2015. (CAC) (Entered Nov. 5, 2015).

\* cited by examiner

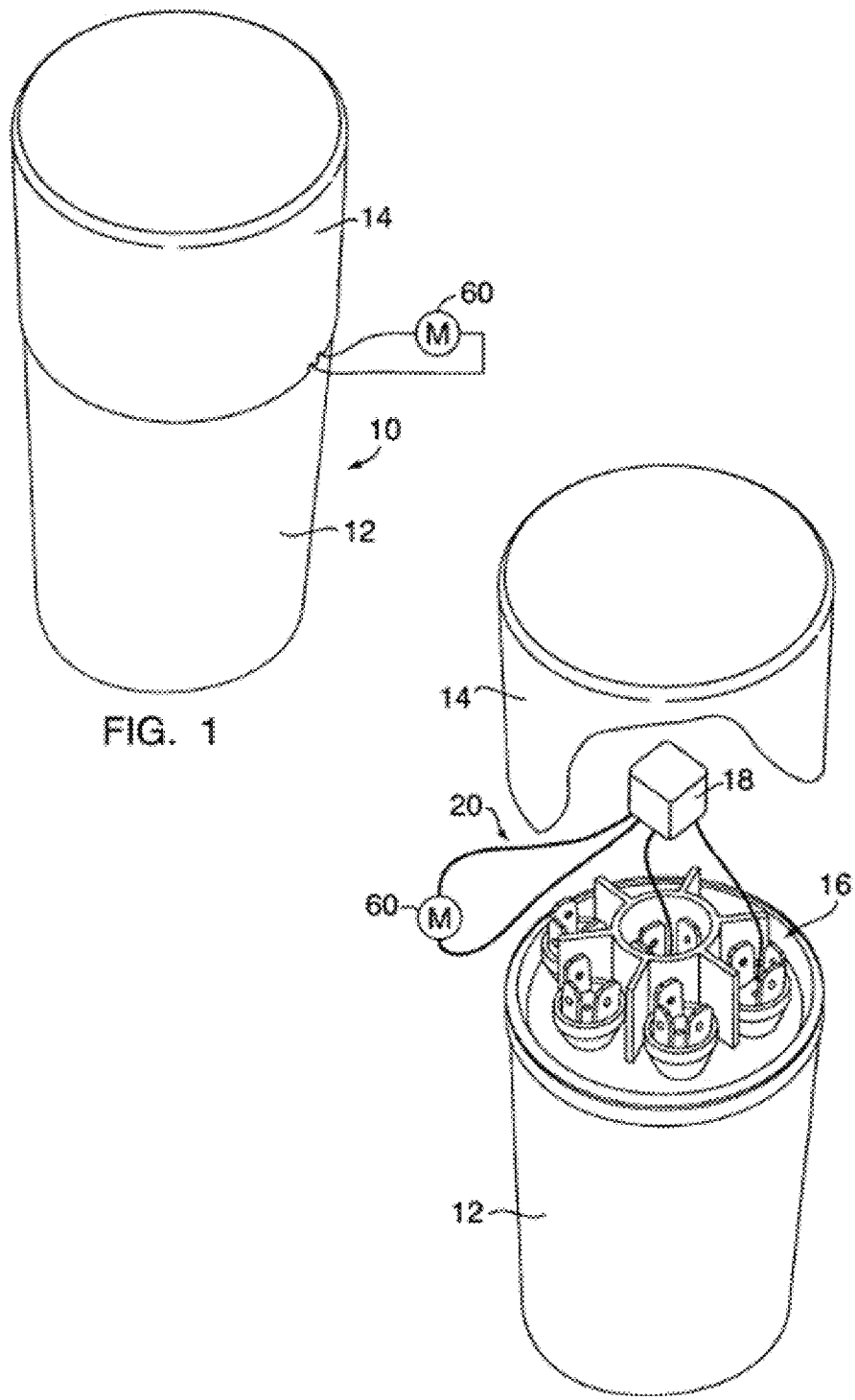

HARD START KIT FOR MULTIPLE REPLACEMENT APPLICATIONS

CLAIM OF PRIORITY

This application is a continuation of and claims priority under 35 U.S.C. §120 to U.S. application Ser. No. 13/826,689, filed on Mar. 14, 2013 (U.S. Pat. No. 8,749,948 scheduled to be issued on Jun. 10, 2014), which is a continuation of and claims priority under 35 U.S.C. §120 to U.S. patent application Ser. No. 12/927,476 filed on Nov. 15, 2010, now U.S. Pat. No. 8,456,795, which claims benefit of priority under 35 USC §119(e) to U.S. Provisional Application Ser. No. 61/281,141, filed on Nov. 13, 2009, the entire contents of which are hereby incorporated by reference.

TECHNICAL FIELD

The invention herein relates to a hard start capacitor replacement unit that is adaptable in the field for replacing any one of a plurality of multiple hard start modules.

BACKGROUND

Single phase induction motors of the type commonly used with air conditioner and cooling equipment compressors generally require some type of auxiliary start capacitor for starting the motor. If the motor is a permanent split capacitor motor, i.e. one that has a run capacitor permanently connected across the run and start windings the motor, the start capacitor is connected in parallel with the run capacitor. The start capacitor, also sometimes referred to as a "hard start capacitor," is connected for a short period of time to start the motor, and the start capacitor is disconnected from the motor near or at the time the motor achieves its run speed. This time is generally on the order of 50-100 milliseconds. Therefore, the start capacitor is wired in series with contacts for disconnecting it. The contacts can be a part of a potential or control relay, or an electronic relay.

If the start capacitor or the relay controlling it fails, the motor will not start. It is then necessary to replace the start capacitor and control relay, and this generally must be accomplished at the site of the motor. For air conditioners and other cooling equipment, this site could be a home, an office, a warehouse or factory, store, or any other building. This complicates the task of replacing the start capacitor and its connecting relay, in that a wide variety of brands and sizes of air conditioning and cooling units are in use, and these units use start capacitors having a variety of capacitances. Therefore, unless a repairman has a replacement hard start kit available with the correctly sized start capacitor, the repairman cannot complete repair without returning to a shop or parts distributor that has an inventory of hard start capacitor replacement parts.

Having to return to a shop or parts distributor in order to obtain the necessary materials to complete a repair is inefficient and time consuming and also delays the time that the customer's cooling system can be returned to operation.

Therefore, it would be advantageous if a repairman could carry one hard start replacement unit that is adaptable to many air conditioning units, cooling units, or other equipment utilizing single phase motors requiring a start capacitor, so that the repairman could adapt the hard start replacement unit to the requirements at hand and complete the repair in a timely manner.

SUMMARY

It is a principal object of the invention herein to provide a hard start capacitor replacement unit adaptable to more than one motor.

It is an additional object of the invention herein to provide a hard start capacitor replacement unit with selectable capacitance.

It is also an object of the invention to provide a hand start capacitor replacement unit with circuit interruption protection.

It is a further object of the invention herein to provide a hard start capacitor replacement unit that can be configured at a repair site to provide a desired selected capacitance.

It is also an object of the invention herein to provide a hard start capacitor replacement unit with at least four selectable capacitances.

It is another object of the invention herein to provide a hard start capacitor replacement unit with selectable capacitance that mounts in substantially the same space as an original start capacitor unit.

In carrying out the invention herein a hard start capacitor replacement unit is provided having a cylindrical container with a cover. A plurality of capacitors are provided within the container, each of said capacitors having a capacitance value. The cover mounts a common terminal electrically connected to common plates of each of said plurality of capacitors. The cover also mounts a plurality of capacitance value terminals spaced apart from the common terminal and from each other, with each capacitance value terminal respectively connected to a capacitor of a corresponding capacitance value. A relay has a contact and means for opening and closing said contact in response to voltage across start and run windings of a single phase electric motor. Wire means are provided for connecting one side of the contact of the relay to one of the start and run terminals of the electric motor. Wire means are also provided for connecting the other side of the contact of the relay to a cover terminal and for connecting another cover terminal to the other of the start and run terminals of the electric motor, at least one of the wire connections being to the common terminal on the cover and the other wire connection being to a capacitance value terminal, such that at least one capacitor is connected between the relay and the motor. The capacitance value terminal is selected to connect a capacitor of the desired capacitance value. Jumper wires are connected between capacitance value terminals on the cover to connect additional capacitors, in order to select a total desired capacitance value.

In other aspects of the invention, the capacitors are wound as individual sections of one cylindrical capacitive element. The capacitors may be metallized polymer capacitors. The film may be polypropylene with a zinc coating.

In another aspect of the invention, there are four capacitors within the cylindrical capacitor container. The values of the capacitors may be about 48 microfarads, about 48 microfarads, about 88 microfarads and about 112 microfarads, each having a corresponding capacitance value cover terminal.

In additional aspects of the invention herein, the cover has four capacitive value terminals and a common terminal. The common terminal is centered on the cover. The cover terminals are separated by insulating barriers. Jumper wires are provided to selectably connect capacitance value terminals.

In yet another aspect of the invention, the cover includes circuit interruption protection.

In a further aspect of the invention, the relay is an electronic relay. The relay may also be a control or potential relay. The relay is sized to be accommodated above the capacitor container within the projected cylindrical envelope thereof. A cylindrical cap is received on the capacitor container and extends therefrom to surround the relay and cover terminals. The cap is frictionally retained on the capacitor container and may be removed to make connections to selected capacitance value cover terminals.

The foregoing and other objects and features of the invention herein will, in part, appear in the following detailed description of the invention and claims, taken together with the drawings.

DESCRIPTION OF DRAWINGS

FIG. 1 is a perspective view of a hard start capacitor replacement unit according to the invention herein shown connected to a schematic motor;

FIG. 2 is an exploded perspective view of the hard start capacitor replacement unit of FIG. 1;

The same reference numerals refer to the same elements throughout the various Figures.

DETAILED DESCRIPTION

Figure 3:
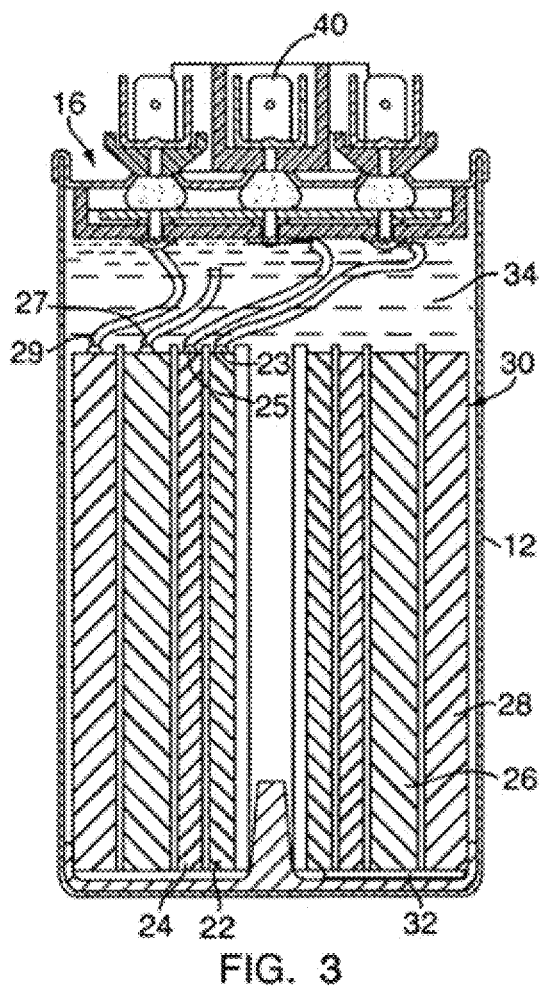
FIG. 3 is a sectional view of the capacitor, capacitor container and cover of the hard start capacitor replacement unit of FIG. 1.

With reference to FIG. 1, a hard start capacitor replacement unit 10 is shown, including a cylindrical capacitor container 12 and a cylindrical cap 14 fitted onto the container 12 and extending therefrom. With reference to FIG. 2, the cap 14 may be removed from the container 12, to expose the cover 16 of the container, an electronic relay 18, and wire means 20 providing desired electrical connections for the hard start capacitor replacement unit 10 to a motor 60.

The container 12 is preferably 2½ inches in diameter with a length of 5¾ inches and has a plurality of capacitors therein. In the embodiment shown and with reference to FIG. 3, four capacitors 22, 24, 26 and 28 are provided within the container 12. Also in the embodiment shown, the capacitors 22, 24, 26 and 28 are wound in a cylindrical capacitive element 30 having a common element terminal 32 at the bottom thereof and four capacitor terminals 23, 25, 27 and 29 at the top thereof.

The capacitors of capacitive element 30 are preferably metallized film capacitors concentrically wound together as the cylindrical capacitance element 30. The film is preferably polypropylene metallized with zinc and may be about 3.8 microns in thickness. This is an advantageous film for several reasons. First, start capacitors generally require a higher capacitance value than run capacitors, i.e., run capacitors generally have typical capacitance values in the range of about 15 to about 65 microfarads, whereas start capacitors may have typical capacitance values up to about 300 microfarads. Such high start capacitance values have generally been achieved with electrolytic capacitors because 300-microfarad capacitors with typical film thicknesses would be bulky and require a large container that may not fit into the space provided in an air conditioning unit or the like. However, with recognition that a start capacitor is utilized for about one second or less as the motor starts, it does not have to be rated at high voltage over a long period of time. Therefore, a thin film may be used and the required capacitance is attained in a reasonably sized capacitive element. A further advantage is that the resultant metallized film capacitive element has stable capacitance values over a relatively wide ambient temperature range, and also has a long service life.

The container is preferably filled with a dielectric fluid 34 and the cover 16 is provided with circuit interruption protection in the event the capacitive element fails, such as shown in FIG. 3 and described in U.S. Pat. No. 7,203,053. These are also advantages in fabricating the capacitors 22, 24, 26 and 28 for the hard start capacitor replacement unit 10 from metallized film.

Although it is preferable to provide the capacitors in a cylindrical capacitive element 30 wound of metallized film, the capacitors 22, 24, 26, 28 may be individual wound capacitors having respective ends electrically connected to form a common terminal. The capacitive element 30 may be provided with more or less than four capacitors if desired. The capacitors may also be provided as two or more capacitive elements each having multiple capacitors.

It is also contemplated to make a hard start capacitor replacement unit with a single multiple value electrolytic capacitor or multiple electrolytic capacitors that may be connected to provide selectable total capacitance values. However, according to present electrolytic capacitor technology, the container for such a capacitor or capacitors would necessarily be larger than the container for a metallized film capacitive element and the capacitance value would not be as stable over ambient temperature ranges.

In the hard stand capacitor replacement unit 10 shown and described herein, capacitor 22 has terminal 23 and preferably has a capacitance of 48 microfarads. Capacitor 24 has terminal 25, and also has a capacitance value of 48 microfarads. Capacitor 26 has capacitor terminal 27, and has a value of 88 microfarads, and capacitor 28 has capacitor terminal 29 and has a value of 112 microfarads.

As perhaps as best seen in FIGS. 5-8, the cover 16 mounts a common cover terminal 40 in the center thereof, and mounts capacitance value terminals 42, 44, 46 and 48 spaced apart from the common cover terminal 40 and from each other. The common cover terminal 40 is connected to common element terminal 32 of the capacitive element 30 and thereby to each of the capacitors 22, 24, 26 and 28. The capacitance value cover terminal 42 is connected with the terminal 23 of capacitor 22 and the capacitance cover terminal 44 is connected with the capacitor terminal 25 of capacitor 24. The capacitance cover terminal 46 is connected with the capacitor terminal 27 of capacitor 26 and capacitance value cover terminal 48 is connected with the capacitor terminal 29 of the capacitor 28. Therefore, the capacitance values of the capacitors 22, 24, 26, 28 are respectively available for wire connections at the corresponding capacitance value cover terminals 42, 44, 46, 48 on the cover 16 of container 12.

A cover insulation barrier 50 is also mounted to the cover 16 to better isolate the cover terminals. The cover insulation barrier 50 has a cylindrical portion 52 surrounding the common cover terminal 40 and has radial extending fins 54-58 that separate the other capacitance value cover terminals. An extra fin is shown, which would insulate another one or two cover terminals if an additional one or two capacitors were provided.

Figure 4:
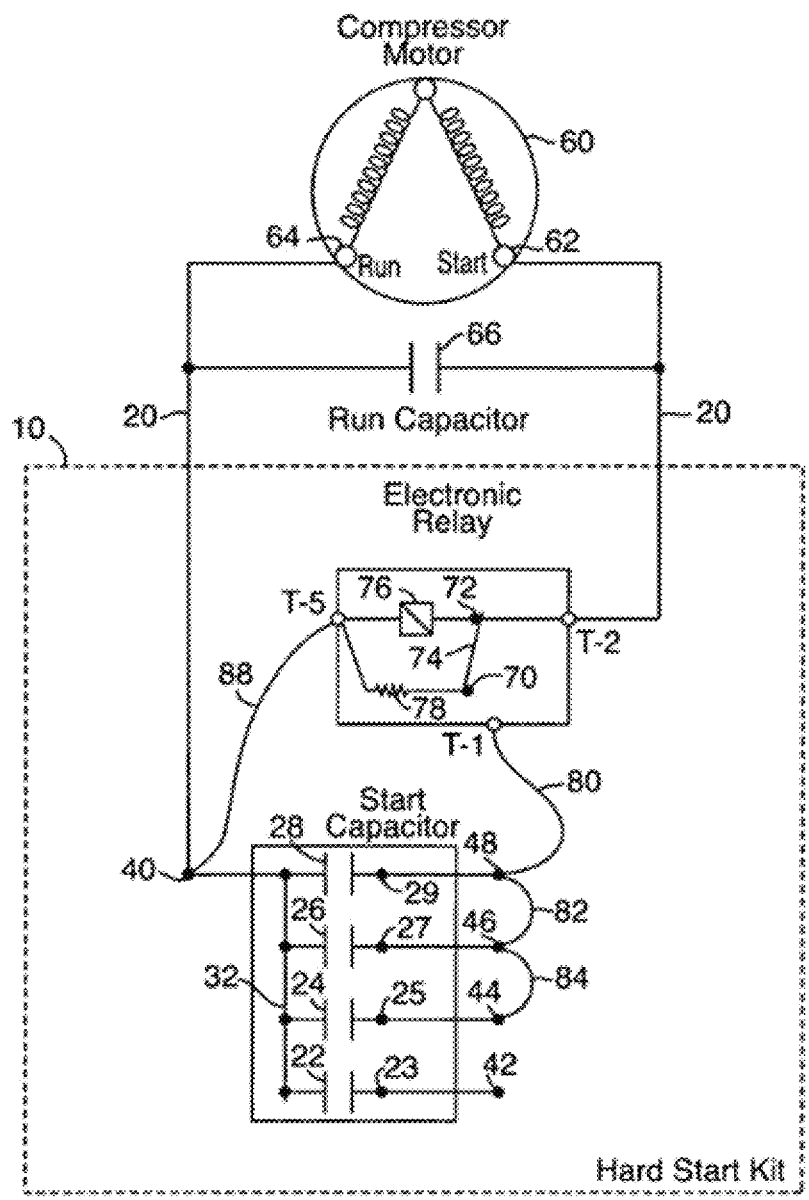
FIG. 4 is a schematic circuit diagram of the hard start capacitor replacement unit of FIG. 1, shown connected to a motor.

With reference to FIG. 4, a schematic of the operation of the start capacitor replacement unit 10 is shown. The electronic relay 18 has external terminals that accept wire termination clips, so that wire connections can be made between the common cover terminal 40, and the capacitance value cover terminals 42, 44, 46 and 48, as well as with the start and run terminals 62 and 64 of a motor 60. External terminals T-1 and T-2 of electronic relay 18 are internally connected with contacts 70 and 72 that may be closed by a contact bar 74, all schematically shown. The electronic relay 18 also has external terminal T-5, and the electronic relay 18 has circuitry indicated at 76 that monitors the voltage and the dv/dt between terminals T-2 and T-5 and controls the opening and closing of the contacts 70 and 72 in response thereto. Terminals T-2 and T-5 are connected to the start and run terminals 62 and 64 of compressor motor 60 by wires 20, so that the electronic relay is monitoring the voltage across the start and run windings. Terminal T-5 may also be connected between the start and run windings of motor 60. When the contacts 70 and 72 are closed, the electronic relay 18 connects the selected ones of the capacitors 22, 24, 26 and 28 across the terminals 62 and 64 in parallel with the run capacitor 66 to assist in starting the motor. A bleeder resister 78 discharges the capacitor(s) when contacts 70, 72 are open. A suitable electronic relay is available from Zhejiang Hongli Electric Co., Part No. HLR3800-6AM1D.

Figure 9:
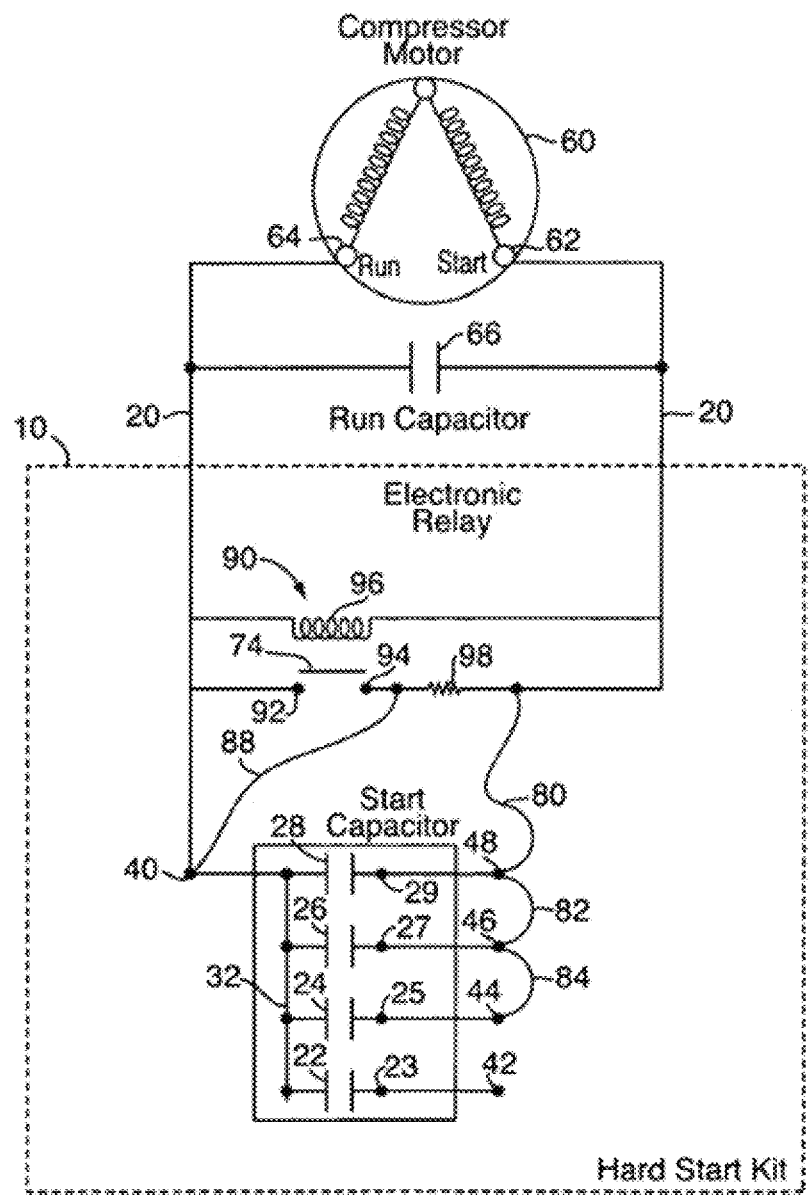
FIG. 9 is a schematic circuit diagram of another hard start capacitor replacement unit according to the invention, shown connected to a motor.

With reference to FIG. 9, the hard start capacitor replacement unit 10 may also be used with a control or potential relay 90 as shown in the schematic. The relay contacts 92 and 94 are closed by contact bar 74 to connect selected ones of capacitors 22, 24, 26, 28 across run terminals 62, 64 of motor 60, and contacts 92, 94 are opened by coil 96 when the motor 60 starts. Bleeder resister 98 is provided to bleed off the capacitor charge when the contacts 92, 94 are open.

It will also be appreciated that although the capacitors of the hard start unit 10 are shown connected across motor terminals 62, 64, the purpose of this connection is to connect the capacitors in parallel with the motor run capacitor of the motor, and any connection that accomplishes this is suitable.

Figure 8:
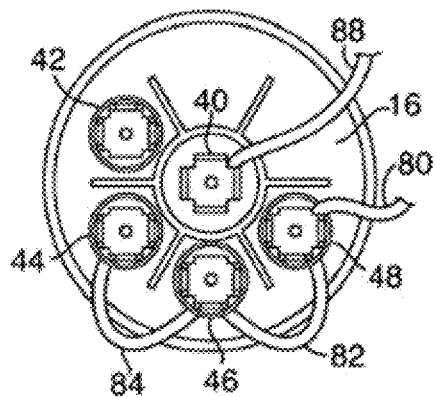
FIG. 8 is a top view of the cover and cover terminals of the hard start capacitor replacement unit of FIG. 1 showing the capacitors connected to provide a fourth capacitance value.

In FIG. 4, the capacitors 22, 24, 26 and 28 are connected as also shown in FIG. 8, in which a first wire 80 connects T-1 of the electronic relay with the cover capacitance value terminal 48, which selects 112 microfarads of capacitance value. Jumper wire 82 between capacitance value terminals 48 and 46 connects an additional 88 microfarads of capacitance value into the circuit. Wire 88 connects the common terminal 40 to terminal T-5 of the electronic relay 18. Jumper wire 84 connecting capacitance value cover terminal 46 and capacitance value cover terminal 44 connects a further 48 microfarads into the circuit. Thus, in the configuration shown in FIGS. 4 and 6, a total capacitance of 248 microfarads is provided to start the motor 60 when the contacts of the electronic relay 18 are closed.

Figure 5:
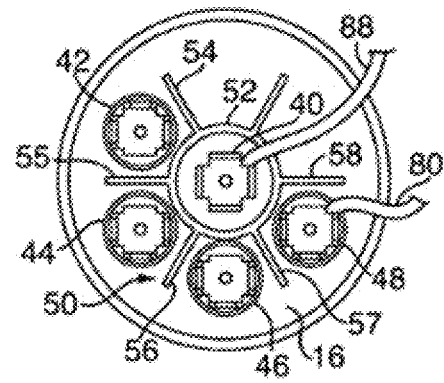
FIG. 5 is a top view of the cover and cover terminals of the hard start capacitor replacement unit of FIG. 1, showing the capacitors connected to provide a first capacitance value.
Figure 6:
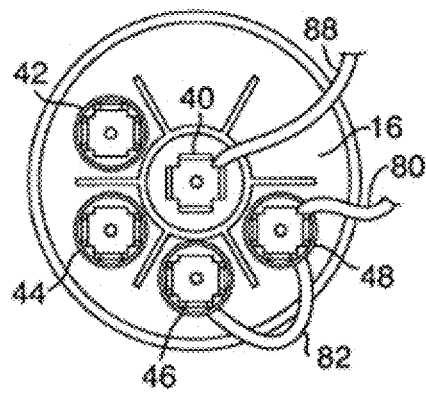
FIG. 6 is a top view of the cover and cover terminals of the hard start capacitor replacement unit of FIG. 1, showing the capacitors connected to provide a second capacitance value.
Figure 7:
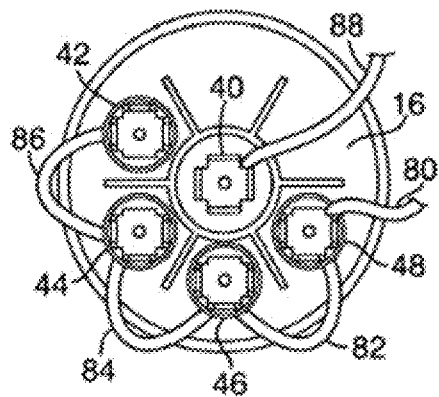
FIG. 7 is a top view of the cover and cover terminals of the hard start capacitor replacement unit of FIG. 1, showing the capacitors connected to provide a third capacitance value.

It will be appreciated that a variety of capacitance values may be selected by connecting various ones of the capacitance cover terminals to each other. Some preferred connections are shown in FIGS. 5-8. FIG. 5 shows connection of capacitor 28 by wire 80 at cover terminal 48 providing 112 microfarads, which is suitable for use where capacitance values in the range 108-130 microfarads are desired for the motor start. FIG. 6 shows connection of capacitors 26 and 28 by jumper wire 82 at cover terminals 46 and 48 providing 200 microfarads of capacitance value, which is suitable for desired capacitance values in the range of 189-227 microfarads. FIG. 7 shows all of the capacitors 22, 24, 26, 28 connected into the circuit at cover terminals 42, 44, 46 and 48 by jumper wires 82, 84 and 86 to provide a total 296 microfarads, which is suitable for use in applications requiring capacitance values in the range of 270-324 microfarads. FIG. 8 shows connection of capacitors 28, 26 and 24 by jumper wires 82 and 84 providing 248 microfarads, for use with applications requiring capacitance values of 233-280 microfarads.

If desired, the total capacitance values connected into the circuit can be further refined with possible capacitance values of 48 microfarads, 88 microfarads, 96 microfarads, 136 microfarads, 160 microfarads, 184 microfarads and 208 microfarads, being available in addition to the 112 microfarads, 200 microfarads, 240 microfarads and 296 microfarads configurations shown above.

Once the desired capacitance value is selected by placing appropriate jumper wires on the cover terminals, the cap 14 may be fitted over the container 12, to surround the cover terminals and electronic relay 18. The hard start capacitor replacement unit 10 has a suitable size and shape to be accommodated in the space provided for the original start capacitor, so the hard start replacement unit 10 is readily accepted for mounting in existing equipment.

As a result of the foregoing, a repairman can carry the hard start capacitor replacement unit 10 to repair site with confidence that a failed start capacitor unit can be replaced without need to return to a shop or parts distributor in order to complete the repair.

Accordingly, a hard start capacitor replacement unit has been described which fulfills the objects of the invention herein. It will be appreciated that various changes may be made by those skilled in the art without departing from the spirit and scope of the invention, which is limited only by the following claims.

What is claimed is:

1. An apparatus comprising:
   a case capable of receiving a plurality of capacitive devices, one or more of the capacitive devices providing at least one capacitor having a first capacitor terminal and a second capacitor terminal;
   a cover mountable to the case, the cover comprising:
   a common cover terminal having a contact extending from the cover,
   at least four capacitor cover terminals, each of the at least four capacitor cover terminals having at least one contact extending from the cover,
   a first conductor capable of electrically connecting the first capacitor terminal to one of the at least four capacitor cover terminals and a second conductor capable of electrically connecting the second capacitor terminal to the common cover terminal, and
   at least four insulation structures, wherein one of the four insulation structures is associated with one of the at least four capacitor cover terminals; and
   a relay having corresponding contacts, wherein the relay is configured to close the corresponding contacts to connect selected capacitors and configured to disconnect the selected capacitors.

2. The apparatus of claim 1, wherein each of the at least four insulation structures is cup shaped.

3. The apparatus of claim 2, wherein the metalized film is polypropylene metalized with zinc.

4. The apparatus of claim 1, wherein the at least one capacitor is a metalized film capacitor.

5. The apparatus of claim 4, wherein the film is about 4 microns or less in thickness.

6. The apparatus of claim 1, wherein the at least one capacitor has a capacitance value between about 48 to 112 microfarads.

7. The apparatus of claim 1, wherein the relay is an electronic relay.

8. The apparatus of claim 7, wherein the electronic relay is sized to fit above the case.

9. The apparatus of claim 1, wherein the relay is a control or potential relay.

10. An apparatus comprising:
   a case capable of receiving a plurality of capacitive devices, one or more of the capacitive devices providing at least one capacitor having a first capacitor terminal and a second capacitor terminal, and one or more of the capacitors having a capacitance value between about 48 to 112 microfarads; and
   a cover assembly mountable to the case, comprising:
      a common cover terminal having a contact extending from the cover,
      at least four capacitor cover terminals, each of the at least four capacitor cover terminals having at least one contact extending from the cover,
      a first conductor capable of electrically connecting the first capacitor terminal to one of the at least four capacitor cover terminals and a second conductor capable of electrically connecting the second capacitor terminal to the common cover terminal, and
      at least four insulation structures, wherein one of the four insulation structures is associated with one of the four capacitor cover terminals; and
   a relay having corresponding contacts, wherein the relay is configured to close the corresponding contacts to connect selected capacitors and configured to disconnect the selected capacitors.

11. The apparatus of claim 10, wherein each of the at least four insulation structures is cup shaped.

12. The apparatus of claim 10, wherein the at least one capacitor is a metalized film capacitor.

13. The apparatus of claim 12, wherein the metalized film is polypropylene metalized with zinc.

14. The apparatus of claim 13, wherein the film is about 4 microns or less in thickness.

15. The apparatus of claim 10, wherein the relay is an electronic relay.

16. The apparatus of claim 15, wherein the electronic relay is sized to fit above the case.

17. The apparatus of claim 10, wherein the relay is a control or potential relay.

18. An apparatus suitable for use in an air-conditioning system and configured to provide a plurality of selectable capacitance values, comprising:
   four capacitive devices housed in a case, each capacitive device independently providing at least one capacitance value between about 48 to 112 microfarads, each capacitive device having a first capacitor terminal and a second capacitor terminal;
   a cover assembly comprising:
      a cover mountable to the case,
      four capacitor cover terminals, each corresponding to one of the capacitive devices and each having at least one contact extending from the cover, and
      four insulation structures, wherein each is configured to provide insulation for at least one of the four cover terminals;
   four conductors, wherein each is configured to electrically connect one capacitor cover terminal to its corresponding capacitive device; and
   a relay having corresponding contacts, wherein the relay is configured to close the corresponding contacts to connect selected capacitive devices and configured to disconnect the selected capacitive devices.

19. The apparatus of claim 18, wherein the four capacitive devices correspond to four capacitor sections of a single wound capacitive device.

20. The apparatus of claim 19, wherein the at least one capacitor section is a metalized film capacitor.

21. The apparatus of claim 20, wherein the metalized film is polypropylene metalized with zinc.

22. The apparatus of claim 21, wherein the film is about 4 microns or less in thickness.

23. The apparatus of claim 18, wherein the four capacitive devices are each separately wound.

24. The apparatus of claim 18, wherein the combined capacitance value of the four capacitive devices is greater than about 48 microfarads.

25. The apparatus of claim 18, wherein the combined capacitance value of the four capacitive devices is greater than about 136 microfarads.

26. The apparatus of claim 18, wherein the apparatus is configured such that at least one capacitive device is operable for use with a motor.

27. The apparatus of claim 18, wherein the case is configured to receive a fill fluid.

28. The apparatus of claim 18, wherein one capacitive device has a capacitance value of about 48 microfarads.

29. The apparatus of claim 18, wherein the relay is an electronic relay.

30. The apparatus of claim 29, wherein the electronic relay is sized to fit above the case.

31. The apparatus of claim 18, wherein the relay is a control or potential relay.

* * * * *